United States Patent
Jung et al.

(10) Patent No.: US 10,724,603 B2
(45) Date of Patent: Jul. 28, 2020

(54) PARKING BRAKE ACTUATOR

(71) Applicant: LG INNOTEK CO., LTD., Seoul (KR)

(72) Inventors: Young Hwan Jung, Seoul (KR); Woo Seob Shim, Seoul (KR); Heok Jin Park, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 140 days.

(21) Appl. No.: 15/778,063

(22) PCT Filed: Nov. 30, 2016

(86) PCT No.: PCT/KR2016/013998
§ 371 (c)(1),
(2) Date: May 22, 2018

(87) PCT Pub. No.: WO2017/095150
PCT Pub. Date: Jun. 8, 2017

(65) Prior Publication Data
US 2019/0249752 A1 Aug. 15, 2019

(30) Foreign Application Priority Data

Dec. 1, 2015 (KR) .......................... 10-2015-0170243
Jan. 12, 2016 (KR) .......................... 10-2016-0003824
Jan. 18, 2016 (KR) .......................... 10-2016-0005930

(51) Int. Cl.
| | |
|---|---|
| *F16H 1/16* | (2006.01) |
| *F16H 57/039* | (2012.01) |
| *H02K 7/116* | (2006.01) |
| *B60T 13/74* | (2006.01) |
| *F16H 1/20* | (2006.01) |
| *F16H 57/02* | (2012.01) |
| *H02K 7/102* | (2006.01) |

(Continued)

(52) U.S. Cl.
CPC .............. *F16H 1/16* (2013.01); *B60T 11/046* (2013.01); *B60T 11/105* (2013.01);
(Continued)

(58) Field of Classification Search
CPC ........ F16H 1/16; F16H 57/02; F16H 63/3416; B60T 13/746; H02K 7/116
See application file for complete search history.

(56) References Cited

U.S. PATENT DOCUMENTS 2,525,240 A * 10/1950 Pierce .................... B63H 25/34
114/155
3,590,653 A * 7/1971 Dreckmann .............. F16H 1/20
74/425

(Continued)

FOREIGN PATENT DOCUMENTS

| KR | 10-2013-0038093 A | 4/2013 |
| KR | 10-2014-0019985 A | 2/2014 |

OTHER PUBLICATIONS

International Search Report in International Application No. PCT/KR2016/013998, filed Nov. 30, 2016.

*Primary Examiner* — David M Fenstermacher
(74) *Attorney, Agent, or Firm* — Saliwanchik, Lloyd & Eisenschenk

(57) ABSTRACT

The present invention provides a parking brake actuator comprising: a motor; a worm gear connected to the motor so that power may be transmitted therebetween; a worm wheel engaged with the worm gear; a driving shaft coupled to the worm wheel and to which a parking cable is connected; and a power transmission gear including a first gear coupled to a rotary shaft of the motor, and a second gear coupled to the rotary shaft of the worm gear and connected to the first gear so that the power may be transmitted therebetween, wherein a gear ratio between the first gear and the second gear is 10:66 and a gear ratio between the worm gear and the worm wheel is 1:54.

17 Claims, 13 Drawing Sheets

Max. 135 MPa

(51) Int. Cl.
   *B60T 11/04*    (2006.01)
   *B60T 11/10*    (2006.01)
   *F16H 63/34*    (2006.01)
(52) U.S. Cl.
   CPC .............. *B60T 13/746* (2013.01); *F16H 1/20* (2013.01); *F16H 57/02* (2013.01); *F16H 57/039* (2013.01); *F16H 63/3416* (2013.01); *H02K 7/102* (2013.01); *H02K 7/116* (2013.01)

(56) References Cited

U.S. PATENT DOCUMENTS

| | | | | |
|---|---|---|---|---|
| 5,363,713 A * | 11/1994 | Pearson | .................. | F16H 1/203 |
| | | | | 74/425 |
| 5,836,076 A | 11/1998 | Duta et al. | | |
| 6,889,578 B2 * | 5/2005 | Spaziani | ................ | F16H 37/065 |
| | | | | 318/15 |
| 7,213,482 B2 * | 5/2007 | Minasian | ................ | E05B 81/25 |
| | | | | 192/20 |
| 2004/0129102 A1 * | 7/2004 | Rennen | ................ | F02D 9/1065 |
| | | | | 74/425 |
| 2006/0117890 A1 * | 6/2006 | Li | ........................ | F16H 37/06 |
| | | | | 74/425 |
| 2007/0295134 A1 * | 12/2007 | Krueger | .................. | B60R 1/074 |
| | | | | 74/425 |
| 2008/0283345 A1 | 11/2008 | Balz et al. | | |
| 2010/0308645 A1 | 12/2010 | Maron et al. | | |
| 2013/0029801 A1 * | 1/2013 | Oberle | .................. | F16H 37/041 |
| | | | | 475/343 |
| 2015/0000444 A1 * | 1/2015 | Schmidt | .................. | B60N 2/166 |
| | | | | 74/425 |

* cited by examiner

Components of Stress Tensor(P1 (major))
Analysis system
Simple Average

- 1.861E+02
- 1.363E+02
- 8.655E+01
- 3.678E+01
- -1.298E+01
- -6.275E+01
- -1.125E+02
- -1.623E+02
- -2.121E+02
- -2.618E+02

GEAR RATIO 2:54 WORM WHEEL

Max. 186 MPa

Components of Stress Tensor(P1 (major))
Analysis system
Simple Average

- 1.352E+02
- 1.013E+02
- 6.743E+01
- 3.352E+01
- -3.838E+01
- -3.429E+01
- -6.820E+01
- -1.021E+02
- -1.360E+02
- -1.699E+02

GEAR RATIO 1:54 WORM WHEEL

Max. 135 MPa

FIG.5A
Components of Stress Tensor(P1 (major))
Analysis system
Simple Average
GEAR RATIO 10:67 FIRST GEAR
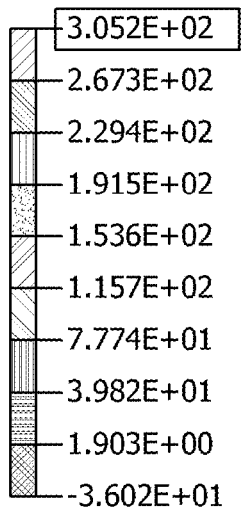
- 3.052E+02
- 2.673E+02
- 2.294E+02
- 1.915E+02
- 1.536E+02
- 1.157E+02
- 7.774E+01
- 3.982E+01
- 1.903E+00
- -3.602E+01
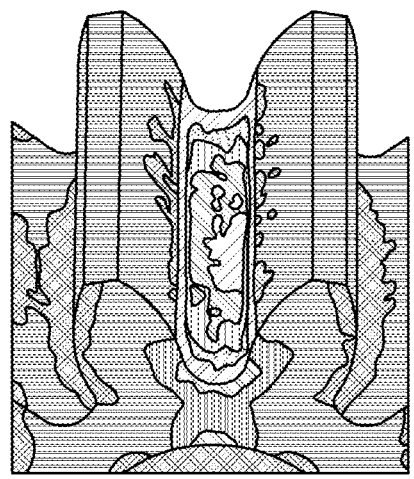
MAXIMUM
305 MPa
FIG.5B
Components of Stress Tensor(P1 (major))
Analysis system
Simple Average
GEAR RATIO 10:66 FIRST GEAR
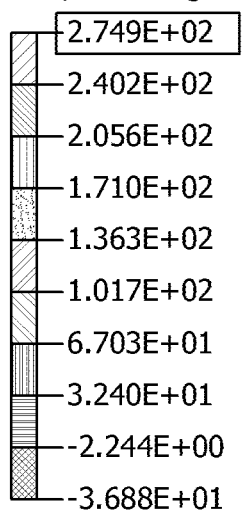
- 2.749E+02
- 2.402E+02
- 2.056E+02
- 1.710E+02
- 1.363E+02
- 1.017E+02
- 6.703E+01
- 3.240E+01
- -2.244E+00
- -3.688E+01
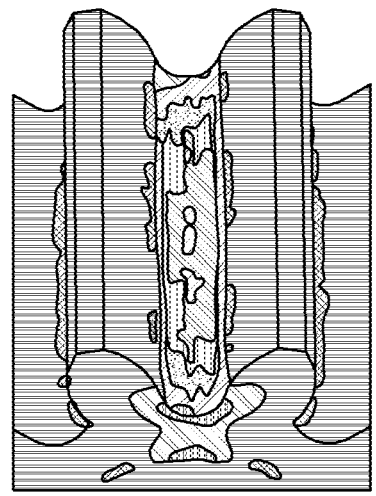
MAXIMUM
275 MPa FIG.6A
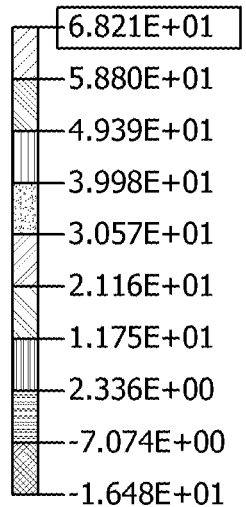
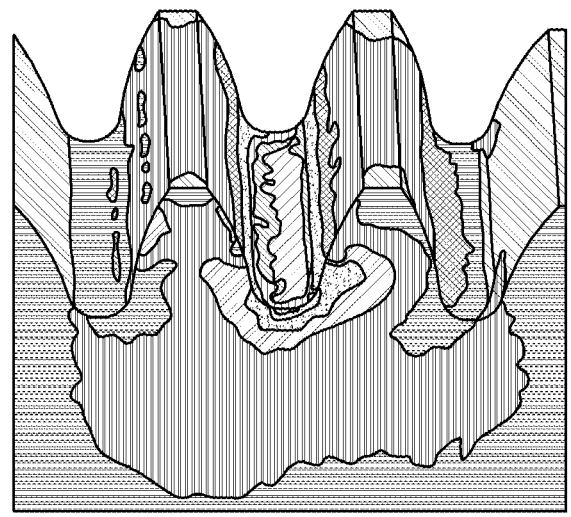
GEAR RATIO 10:67 SECOND GEAR
MAXIMUM
68 MPa
FIG.6B
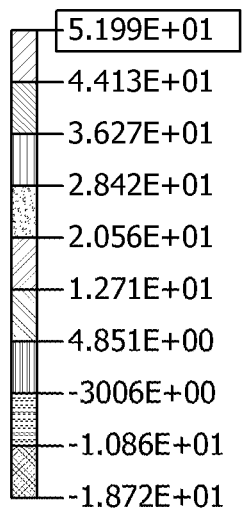
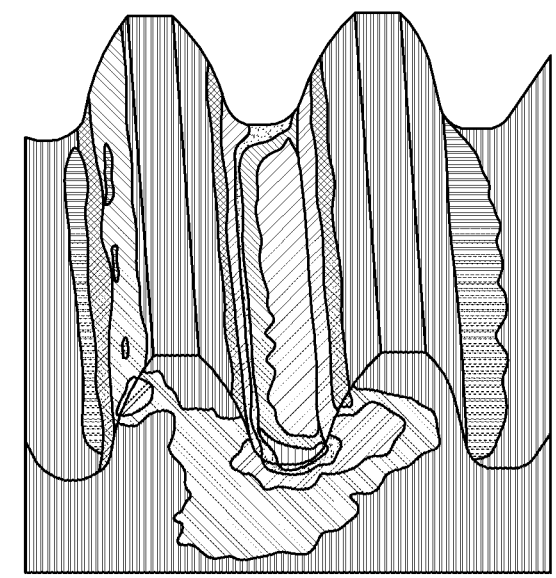
GEAR RATIO 10:66 SECOND GEAR
MAXIMUM
52 MPa

PARKING BRAKE ACTUATOR

CROSS-REFERENCE TO RELATED APPLICATIONS

This application is the U.S. national stage application of International Patent Application No. PCT/KR2016/013998, filed Nov. 30, 2016, which claims priority to Korean Application Nos. 10-2015-0170243, filed Dec. 1, 2015; 10-2016-0003824, filed Jan. 12, 2016; and 10-2016-0005930, filed Jan. 18, 2016, the disclosures of each of which are incorporated herein by reference in their entirety.

TECHNICAL FIELD

An embodiment of the present invention relates to a parking actuator including a gear configured to transmit a driving force of a motor.

BACKGROUND ART

A brake system is an apparatus configured to decelerate and stop a driving vehicle while maintaining a stopped state of the vehicle, and includes a parking brake configured to decelerate and stop the driving vehicle while maintaining the vehicle in the stopped state.

The parking brake pulls a parking cable by an operation of a lever provided in one side of a driver seat in the vehicle and then provides a braking force to wheels of the vehicle connected to the parking cable to maintain a state in which the wheels of the vehicle are stopped, and on the other hand, when the lever is released and thus the parking cable is released, the braking force applied to the wheels of the vehicle is removed.

Since the lever has to be operated by a driver when starting to park or drive, which makes the parking brake operable only by will of the driver, using the parking brake has been inconvenient. Accordingly, an EPB (electric parking brake) system in which the parking brake is automatically operated according to an operation state of the vehicle was developed.

The EPB system automatically operates or releases the parking brake and secures braking stability in an emergency by connection with a manual operation mode of the driver according to a switch operation, a HECU (electro-hydraulic control unit), an ECU (engine electric control unit), a TCU (traction control unit), and the like.

The EPB system integrally includes an ECU, a motor, a gear, a parking cable, a braking force sensor (force sensor), and the like. Here, the ECU operates a parking brake actuator after receiving related information from the HECU, the ECU, the TCU and the like through a CAN (controller area network), and then identifying intentions of the driver.

When a motor of the parking brake actuator is operated, since a gear assembly is operated by driving of the motor and then a driving shaft is rotated and the parking cable is pulled by an operation of the gear assembly, the braking force is applied to the wheels of the vehicle, and thus the vehicle maintains a stable state. Here, the gear assembly may include a worm connected to the rotary shaft of the motor so that power is transmittable, and a worm wheel.

The worm and the worm wheel are advantageous for gaining high torque at a large deceleration ratio. However, the motor has to be operated to rotate the worm and the worm wheel, and currents are consumed to operate the motor. Since an environment in which the vehicle has more electrical components and receives a driving force through the motor sharply has been increasing, a structure in which a rotating force of the motor can be transmitted to the driving shaft to which the parking cable is connected with low power consumption and high efficiency, is urgently necessary.

Further, the parking brake actuator receives an operation of the motor through a spur gear, and the spur gear is connected to a worm gear to be driven.

However, since the conventional spur gear and worm gear are connected to each other by insertion-injection molding, and have a structure in which the spur gear is supported using an additional bracket, costs and processes increase.

Further, the conventional parking brake actuator has a structure in which a molding type upper housing formed of a resin material and a worm gear formed of a resin material come into contact with each other, and thus is vulnerable to abrasion.

Technical Problem

The present invention is directed to providing a parking brake actuator capable of transmitting a rotating force of a motor to a driving shaft to which a parking cable is connected with low power consumption and high efficiency.

Further, an embodiment provides a parking brake actuator capable of reducing costs by changing an inner structure.

In addition, another embodiment provides a parking brake actuator having a changed coupling structure by inserting a bracket of an upper housing thereinto.

Problems desired to be solved by the present invention are not limited to the above-described problems, other problems not mentioned above may be apparently understood by those skilled in the art from below.

Technical Solution

An embodiment of the present invention provides a parking brake actuator including a motor; a worm gear connected to the motor so that power may be transmitted therebetween; a worm wheel engaged with the worm gear; a driving shaft coupled to the worm wheel and to which a parking cable is connected; and a power transmission gear including a first gear coupled to a rotary shaft of the motor, and a second gear coupled to the rotary shaft of the worm gear and connected to the first gear so that the power may be transmitted therebetween, wherein a gear ratio between the first gear and the second gear is 10:66 and a gear ratio between the worm gear and the worm wheel is 1:54.

A first embodiment of the present invention provides a parking brake actuator including a motor; a spur gear connected to the motor so that power may be transmitted therebetween; a worm gear connected to the spur gear, and a housing configured to accommodate the spur gear and the worm gear, wherein the spur gear is coupled to the worm gear in a pressing method.

A second embodiment of the present invention provides a parking brake actuator including a motor; a spur gear connected to the motor so that power may be transmitted therebetween; a worm gear connected to the spur gear, and a first housing and a second housing configured to accommodate the spur gear and the worm gear, wherein a pair of brackets configured to surround an outer circumferential surface of the worm gear are located between the worm gear and the housings.

Advantageous Effects

According to an embodiment of the present invention, power consumption is minimized by setting a gear ratio between a first gear coupled to a rotary shaft of a motor, and a second gear coupled to a rotary shaft of a worm gear and engaged with the first gear, to 10:66, and setting a gear ratio between the worm gear and a worm wheel to 1:54, and thus an advantageous effect for driving a parking brake actuator with low power consumption and high efficiency is provided.

According to the embodiment, material costs can be reduced by changing a coupling structure between a power transmission gear and the worm gear.

According to the embodiment, abrasion of a housing can be inhibited by changing an inner structure of a parking actuator.

DESCRIPTION OF DRAWINGS

FIG. 5A is, as the conventional structure, an analysis view of stress intensity applied to the first gear when a gear ratio between the first gear and the second gear is 10:67.

FIG. 5B is an analysis view of stress intensity applied to the first gear 510 of the parking brake actuator according to the embodiment of the present invention.

FIG. 6A is, as the conventional structure, an analysis view of stress intensity applied to the second gear 520 when the gear ratio between the first gear and the second gear is 10:67.

FIG. 6B is an analysis view of stress intensity applied to the second gear 520 of the parking brake actuator according to the embodiment of the present invention.

MODES OF THE INVENTION

A purpose, particular advantages, and new characteristics of the present invention will be more apparent by detailed descriptions which will be described below and exemplary embodiments related to the accompanying drawings. Further, terms or words used in the description and the scope of the claims should not be limited to dictionary meanings, and should be understood as meaning and concepts which coincide with the spirit of the present invention on the basis of the principle that the inventor may appropriately define means of the terms to describe the invention thereof in the best method. In addition, in the description of the present invention, the detailed description of the related art will be omitted to clearly describe the present invention.

Further, it should be understood that, although the terms "first," "second," and the like may be used herein to describe various elements, the elements are not limited by the terms. The terms are only used to distinguish one element from another. For example, a first element could be termed a second element, and similarly, a second element could be termed a first element without departing from the scope of the present disclosure. The term "and/or" includes combinations of one or all of a plurality of associated listed items.

Figure 1:
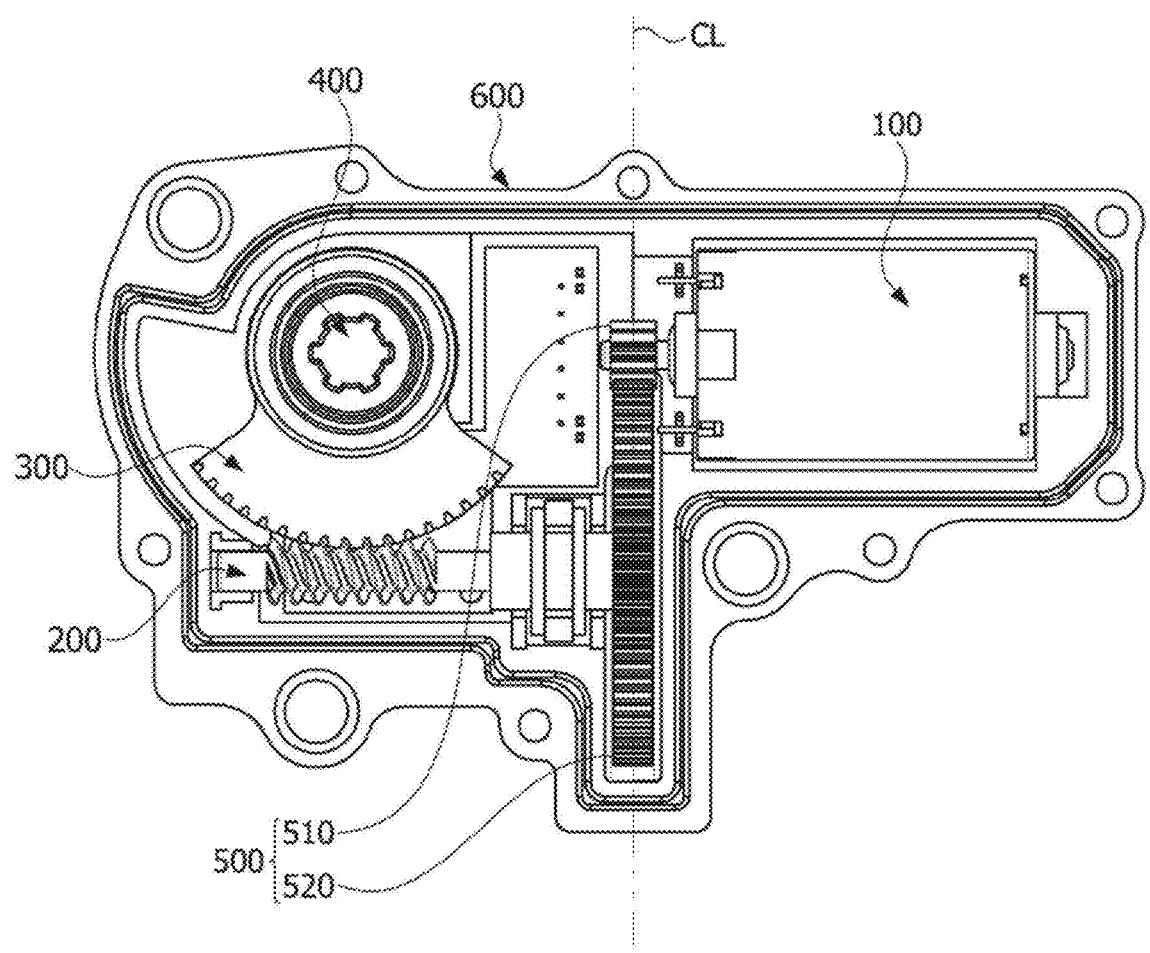
FIG. 1 is a view illustrating a parking brake actuator according to an exemplary embodiment of the present invention.

Referring to FIG. 1, a parking brake actuator according to an exemplary embodiment of the present invention may include a motor 100, a worm gear 200, a worm wheel 300, a driving shaft 400, a power transmission gear 500, and a housing 600.

The worm gear 200, the worm wheel 300, and the power transmission gear 500 serve to transmit a rotating force of the motor 100 to the driving shaft 400. A parking cable may be connected to the driving shaft 400.

The worm gear 200 and the worm wheel 300 are used when a rotary shaft of a driving gear and a rotary shaft of a driven gear are perpendicular to each other and power is transmitted in a vertical direction, and serve to transmit the rotating force of the motor 100 to the driving shaft 400 in a state in which the driving shaft 400 to which the parking cable is connected is disposed to be perpendicular to a rotary shaft of the motor 100.

Figure 2:
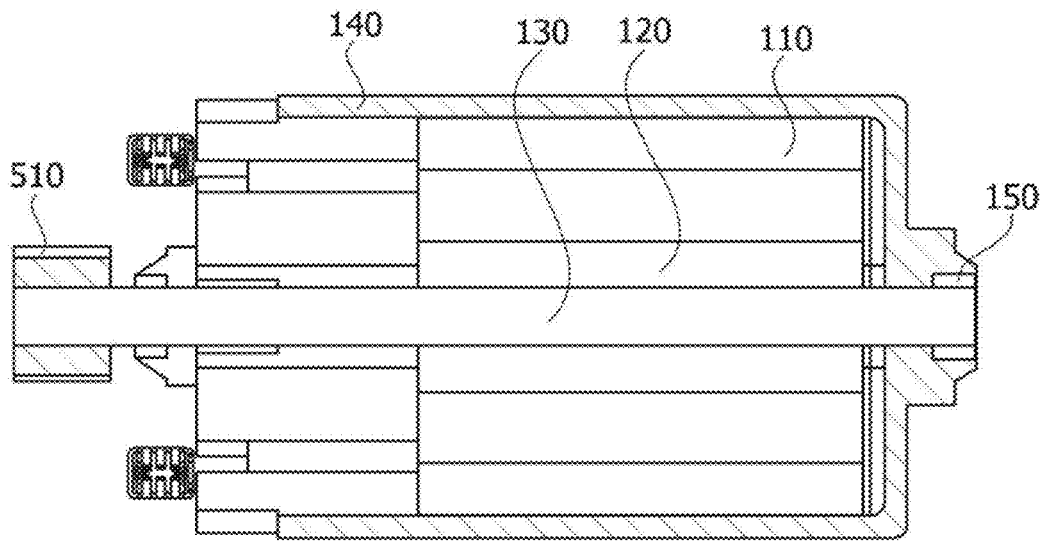
FIG. 2 is a view illustrating a motor illustrated in FIG. 1.

FIG. 2 is a view illustrating the motor illustrated in FIG. 1.

Referring to FIG. 2, the motor 100 may include a stator 110, a rotor 120, and a rotary shaft 130.

The stator 110 may be fixed to the inside of a housing 140 of the motor. The rotor 120 may be disposed in the stator 110, and the rotary shaft 130 may be coupled to a center portion of the rotor 120. A coil forming a rotating magnetic field may be wound around the stator 110, and the rotor 120 may include a magnet. The rotor 120 rotates due to an electric interaction between the coil and the magnet, and when the rotor 120 rotates, the rotary shaft 130 rotates to generate a driving force which pulls or pushes the parking cable.

The rotary shaft 130 may be rotatably supported by a bearing 150.

The stator 110 may be formed of one core or a plurality of divided cores coupled to each other.

Figure 3:
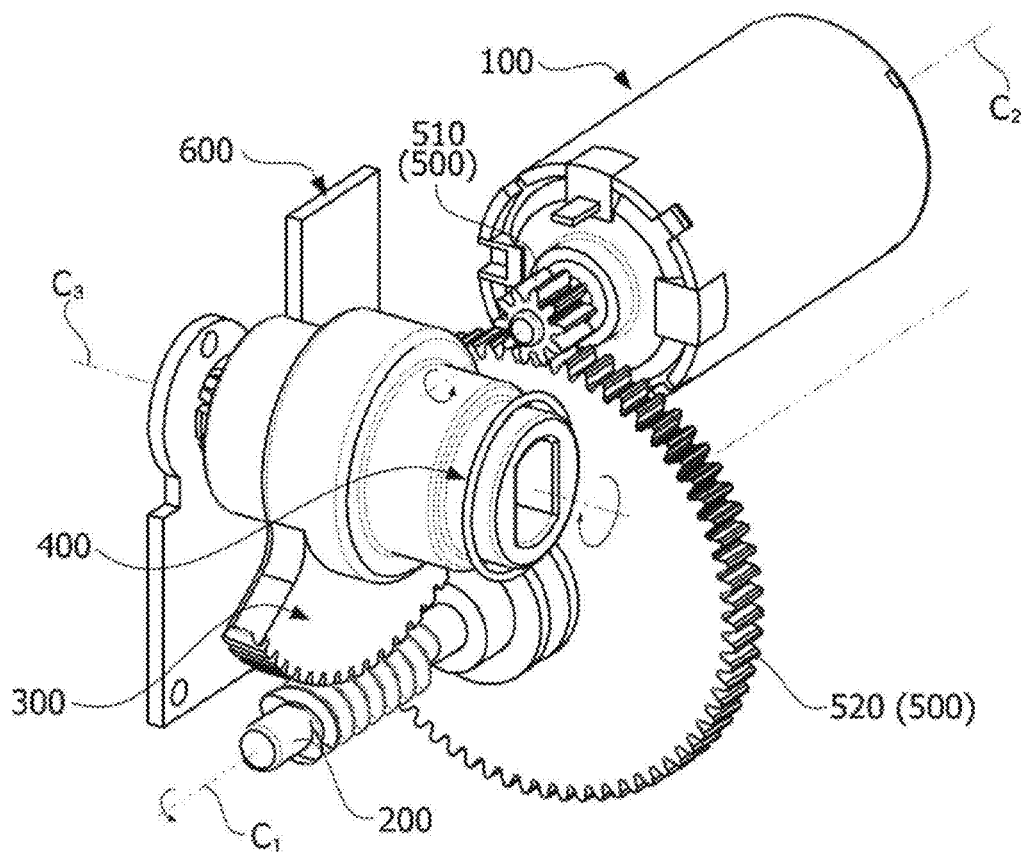
FIG. 3 is a view illustrating a worm gear, a worm wheel, and a power transmission gear.

FIG. 3 is a view illustrating the worm gear, the worm wheel, and a power transmission gear.

Referring to FIGS. 1 and 3, the worm gear 200 may be disposed so that a rotary shaft C1 thereof and a rotary shaft C2 of the motor 100 become parallel to each other. The worm wheel 300 is engaged with the worm gear 200 and the driving shaft 400 is coupled to a center shaft of the worm wheel 300. A rotary shaft C3 of the worm wheel 300 and the rotary shaft C1 of the worm gear 200 are orthogonal.

The motor 100 and the worm gear 200 are connected through the power transmission gear 500.

The power transmission gear 500 may include a first gear 510 and a second gear 520.

The first gear 510 may be connected to the rotary shaft of the motor 100. Further, the second gear 520 may be coupled to the rotary shaft of the worm wheel 300. The first gear 510 and the second gear 520 are disposed to be engaged with each other. Since the number of teeth of the second gear 520 is greater than the number of teeth of the first gear 510, rotation of the motor 100 is decelerated and transmitted to the worm wheel 300.

When the motor 100 rotates, the first gear 510 rotates. When the first gear 510 rotates, due to linkage, the second gear 520 and the worm gear 200 rotate. When the worm gear 200 rotates and thus the worm wheel 300 rotates around the rotary shaft C3, since the driving shaft 400 rotates and pulls the parking cable, a braking force is applied to the parking brake.

The worm gear 200 and the worm wheel 300 are gear apparatuses capable of gaining high torque at a large deceleration ratio.

The rotating force of the motor 100 is transmitted to the worm gear 200 and the worm wheel 300 through the first gear 510 and the second gear 520 in a process of transmitting the rotating force of the motor 100. Currents are consumed to operate the motor 100, and since an environment in which a vehicle has more electrical components and receives a driving force through the motor sharply increases, a power transmission structure with low power consumption and high efficiency is necessary.

Accordingly, the parking brake actuator according to the embodiment of the present invention implements a power transmission process which minimizes power consumption through a gear ratio between the first gear 510 and the second gear 520, and through a gear ratio between the worm gear 200 and the worm wheel 300.

First, the gear ratio between the first gear 510 and the second gear 520 may be 10:66. For example, when the number of teeth of the first gear 510 is ten, the number of teeth of the second gear 520 may be 66.

Further, the gear ratio between the worm gear 200 and the worm wheel 300 may be 1:54. For example, the number of teeth of the worm gear 200 may be one and the number of teeth of the engaged worm wheel 300 may be 54.

Figure 4A:
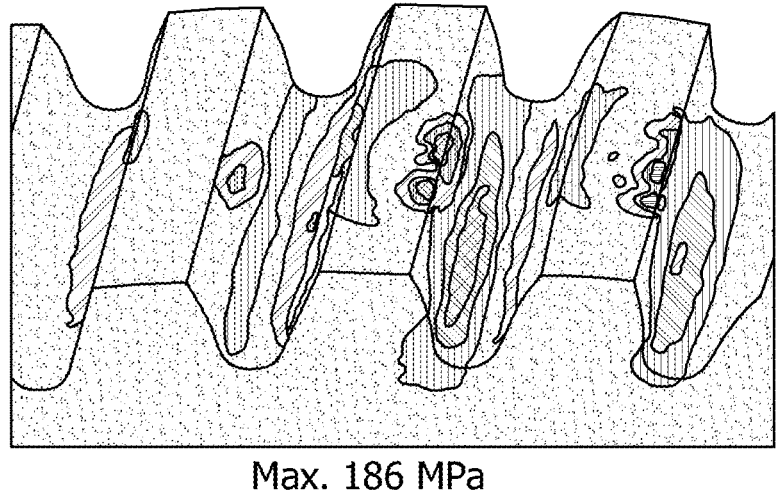
FIG. 4A is, as a conventional structure, an analysis view of stress intensity applied to the worm wheel when a gear ratio between the worm gear 200 and the worm wheel 300 is 2:54.
Figure 4B:
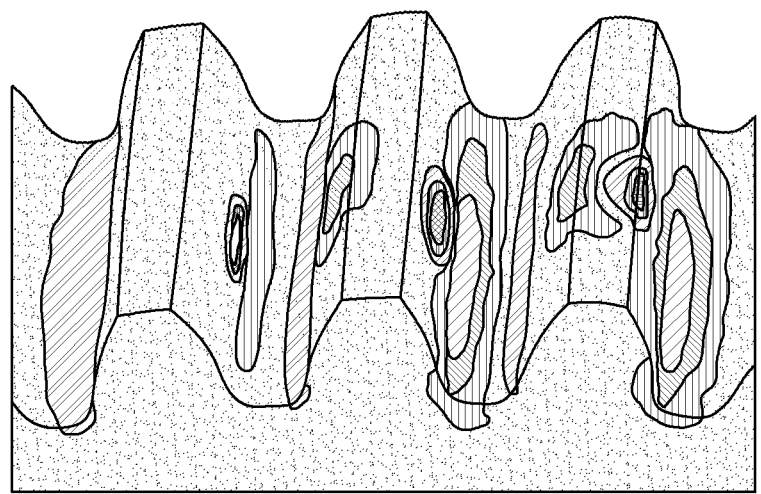
FIG. 4B is an analysis view of stress intensity applied to the worm wheel 200 when a gear ratio between the worm gear 200 and the worm wheel 300 of the parking brake actuator according to the embodiment of the present invention is 1:54.

FIG. 4A is, as a conventional structure, an analysis view of stress intensity applied to the worm wheel when a gear ratio between the worm gear 200 and the worm wheel 300 is 2:54, and FIG. 4B is an analysis view of stress intensity applied to the worm wheel 200 when a gear ratio between the worm gear 200 and the worm wheel 300 of the parking brake actuator according to the embodiment of the present invention is 1:54.

Referring to FIGS. 4A and 4B, when a gear ratio between the worm gear and the worm wheel is 2:54, maximum stress applied to the worm wheel is 186 MPa, and when the gear ratio between the worm gear 200 and the worm wheel 300 is 1:54, maximum stress applied to the worm wheel 300 is shown to be 135 MPa. Referring to FIGS. 4A and 4B, when the gear ratio between the worm gear 200 and the worm wheel 300 is 1:54, since the maximum stress is smaller than that of a case in which the gear ratio between the worm gear and the worm wheel is 2:54, power consumption may be reduced.

FIG. 5A is, as the conventional structure, an analysis view of stress intensity applied to the first gear when a gear ratio between the first gear and the second gear is 10:67, and FIG. 5B is an analysis view of stress intensity applied to the first gear 510 of the parking brake actuator according to the embodiment of the present invention.

Referring to FIGS. 5A and 5B, when the gear ratio between the first gear 510 and the second gear 520 is 10:67, maximum stress applied to the first gear 510 is 305 MPa, and when a gear ratio between the first gear 510 and the second gear 520 is 10:66, maximum stress applied to the first gear 510 is shown to be 275 MPa. Referring to FIGS. 5A and 5B, when the gear ratio between the first gear 510 and the second gear 520 is 10:66, since the maximum stress is smaller than that of a case in which the gear ratio between the first gear and the second gear is 10:67, power consumption may be reduced.

FIG. 6A is, as the conventional structure, an analysis view of stress intensity applied to the second gear 520 when the gear ratio between the first gear and the second gear is 10:67, and FIG. 6B is an analysis view of stress intensity applied to the second gear 520 of the parking brake actuator according to the embodiment of the present invention.

Referring to FIGS. 6A and 6B, when the gear ratio between the first gear 510 and the second gear 520 is 10:67, maximum stress applied to the second gear 520 is 68 MPa, and when the gear ratio between the first gear 510 and the second gear 520 is 10:66, maximum stress applied to the second gear 520 is shown to be 52 MPa. Referring to FIGS. 6A and 6B, when the gear ratio between the first gear 510 and the second gear 520 is 10:66, since the maximum stress is smaller than that of the case in which the gear ratio between the first gear 510 and the second gear 520 is 10:67, power consumption may be reduced.

As described above, in a state in which the gear ratio between the first gear 510 and the second gear 520 is 10:66 and the gear ratio between the worm gear 200 and the worm wheel 300 is 1:54, since the maximum stress applied to each gear is relatively small, power consumption of the motor may be reduced.

Figure 7:
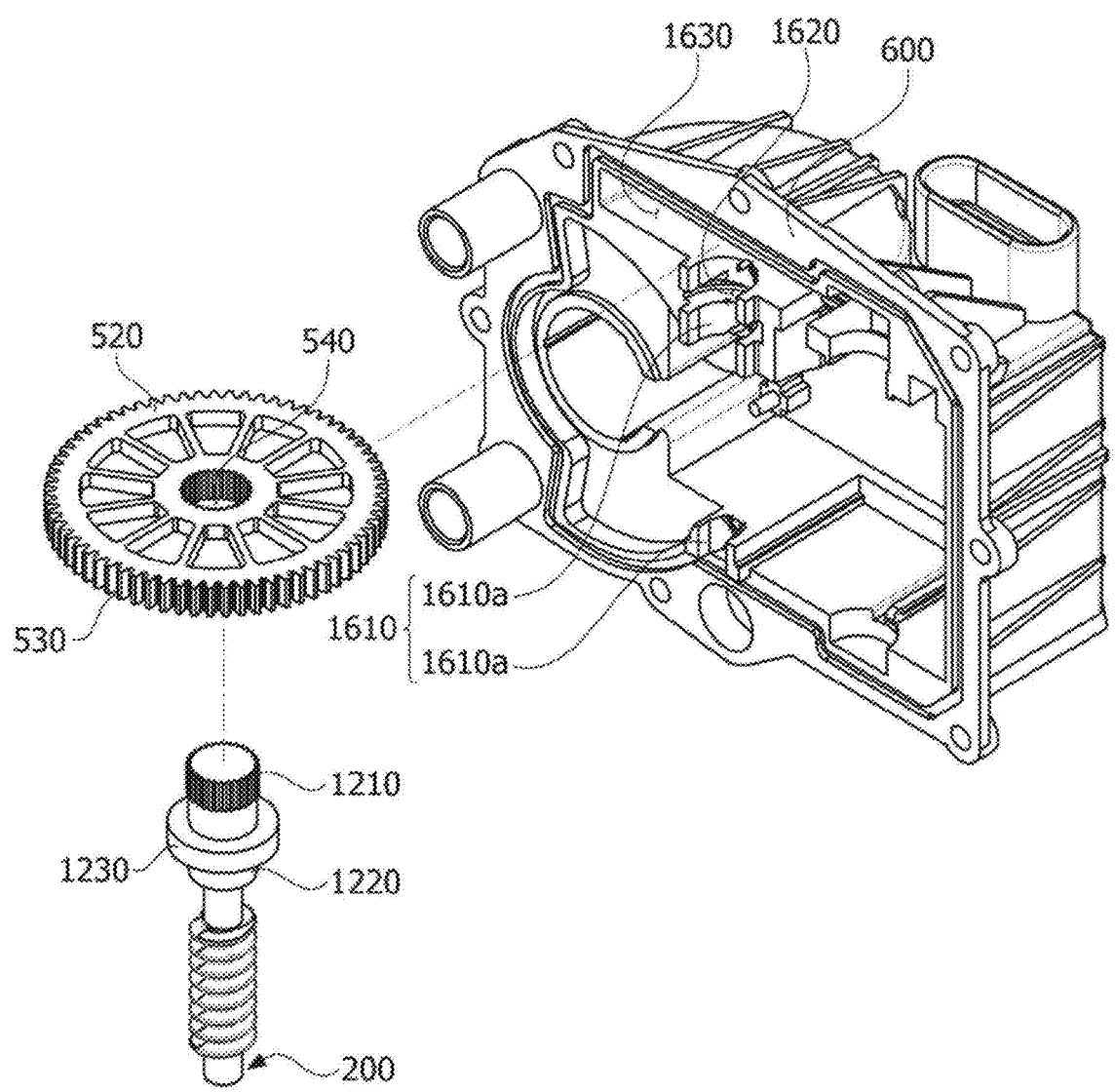
FIG. 7 is a view illustrating a coupling structure of a parking brake actuator according to a first embodiment of the present invention.
Figure 8:
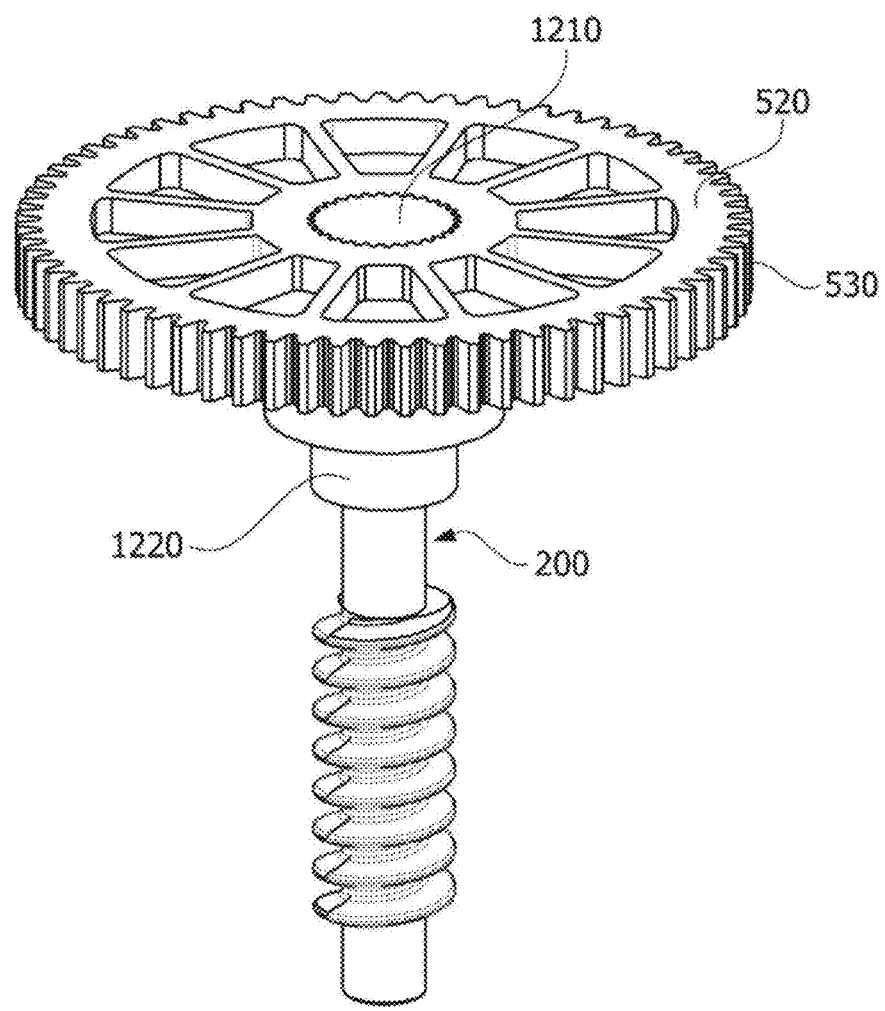
FIG. 8 is a view illustrating a coupling structure between a second gear and a worm gear, which are components of the parking brake actuator according to the first embodiment of the present invention.
Figure 9:
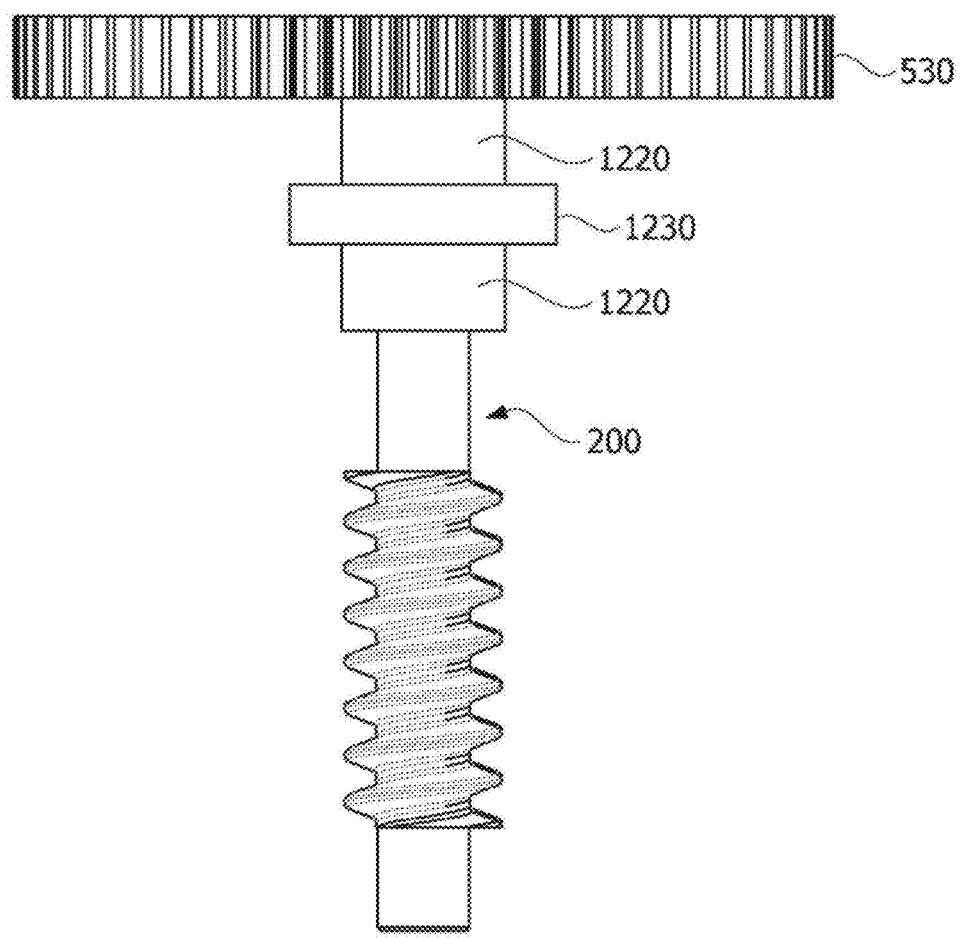
FIG. 9 is a front view of the coupling structure of the parking brake actuator according to the first embodiment of the present invention.

FIG. 7 is a view illustrating a coupling structure of a parking brake actuator according to a first embodiment of the present invention, FIG. 8 is a view illustrating a coupling structure between a second gear and a worm gear, which are components of the parking brake actuator according to the first embodiment of the present invention, and FIG. 9 is a front view of the coupling structure of the parking brake actuator according to the first embodiment of the present invention.

Referring to FIGS. 7 to 9, the parking brake actuator may include a second gear 520 configured to receive power of a motor 100, a worm gear 200 connected to the second gear 520, and a housing 600 configured to accommodate the second gear 520 and the worm gear 200.

The second gear 520 has sawteeth 530 formed on an outer circumferential surface thereof, and the sawteeth 530 are connected to the motor 100 to receive the power of the motor 100. A general plate shape gear may be used as the second gear 520, and the second gear 520 may have an insertion hole 540 at a center thereof to be coupled to the worm gear 200.

The worm gear 200 includes an insertion part 1210 at one side thereof to be connected to the insertion hole 540 of the second gear 520, and includes a connection part at the other side thereof to be connected to the worm wheel 300. The insertion part 1210 is inserted into the insertion hole 540 of the second gear 520 to receive a driving force of the motor 100. The insertion part 1210 may have a structure engaged with the insertion hole 540 to stably receive the driving force of the motor. As an embodiment, the sawteeth 530 are formed on an outer circumferential surface of the insertion part 1210, and sawteeth having widths and intervals the same as those of the sawteeth 530 may be provided on an inner surface of the insertion hole 540. A coupling structure between the insertion part 1210 and the insertion hole 540 has no limitation, and various coupling structures for transmitting a rotating force of the motor transmit motor may be used. In an insertion structure of the worm gear 200, the second gear 520 and the worm gear 200 may be coupled through a pressing method, deviating from a conventional insertion-injection structure.

A support 1220 inserted into the housing may be provided on an outer circumferential surface of the worm gear 200. The support 1220 is inserted into a support hole 1610 formed in the housing 600 in a cylindrical shape. As an embodiment, the support hole 1610 formed in the housing 600 may be located to support both end portions of the worm gear 200. Since a resin material using a molding method is used for a support of a conventional worm gear, a bracket formed of a metal material is needed to inhibit abrasion due to rotation of the support. In the present invention, a separate bracket is omitted by forming the support 1220 of a metal material, and thus a separate process of assembling the bracket may be omitted.

A protrusion 1230 may be provided at one area of a center of the support 1220 to be inserted into the housing 600. The protrusion 1230 may be inserted into a protrusion support hole 1620 formed in the housing 600 to inhibit separation of the worm gear 200. The support 1220 may also be formed of a metal material to inhibit abrasion of the housing 600. The protrusion 1230 may be provided to have a predetermined thickness and be inserted into the protrusion support hole 1620.

The housing 600 may form an inner space to accommodate the second gear 520, the worm gear 200, and other components. The housing 600 may have a second gear accommodation groove 1630 formed to accommodate the second gear 520, and a support hole 1610 configured to support the worm gear 200 vertically connected to the second gear 520 to receive the power of the motor. The support hole 1610 may be provided as a plurality of support holes 1610a and 1610b in the housing 600 to support both end portions of the worm gear 200. The protrusion support hole 1620 configured to accommodate the protrusion 1230 provided on the one area of the support 1220 may be formed in one area of the support hole 1610a.

Figure 10:
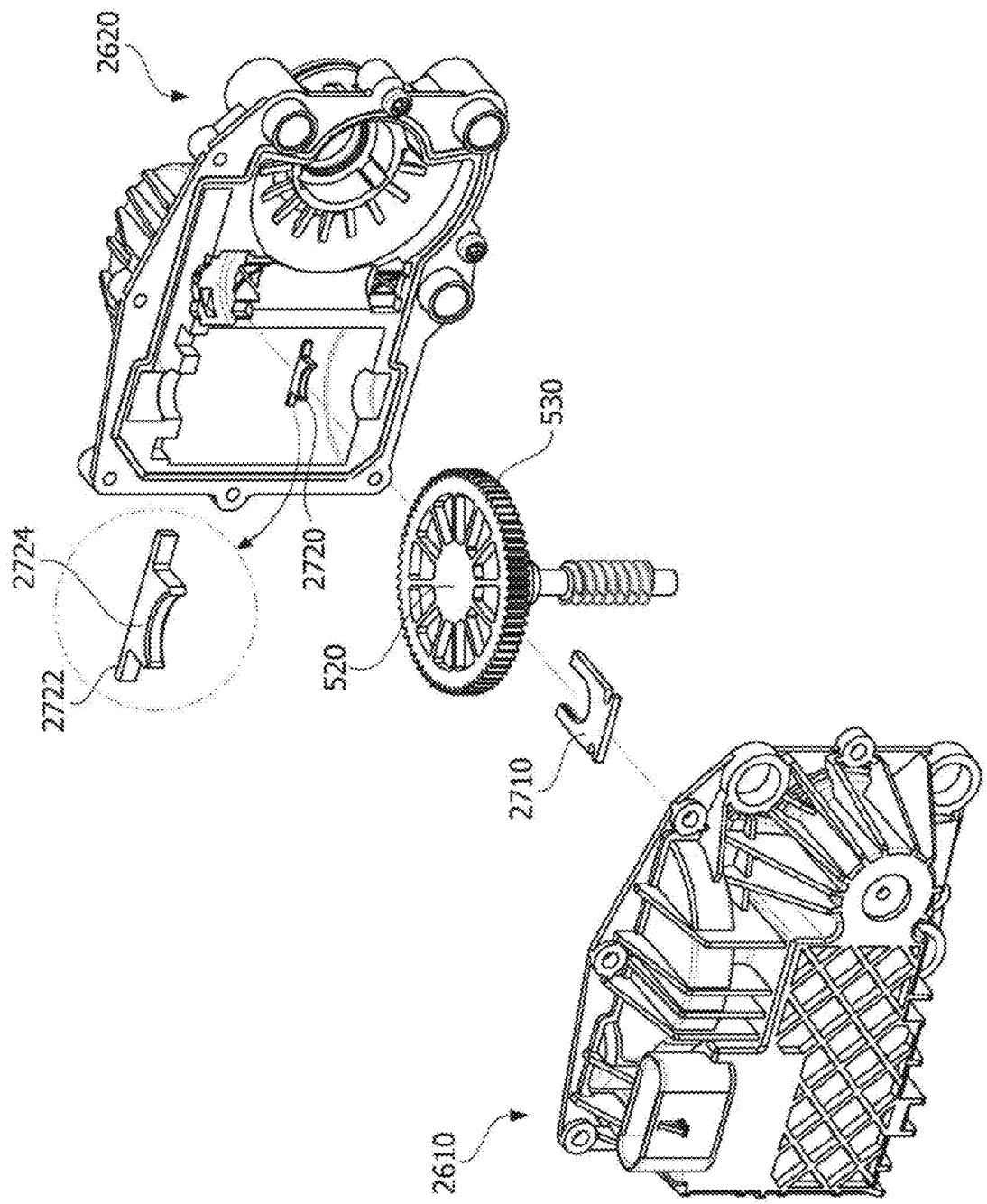
FIG. 10 is a view illustrating a coupling structure of a parking brake actuator according to a second embodiment of the present invention.
Figure 11:
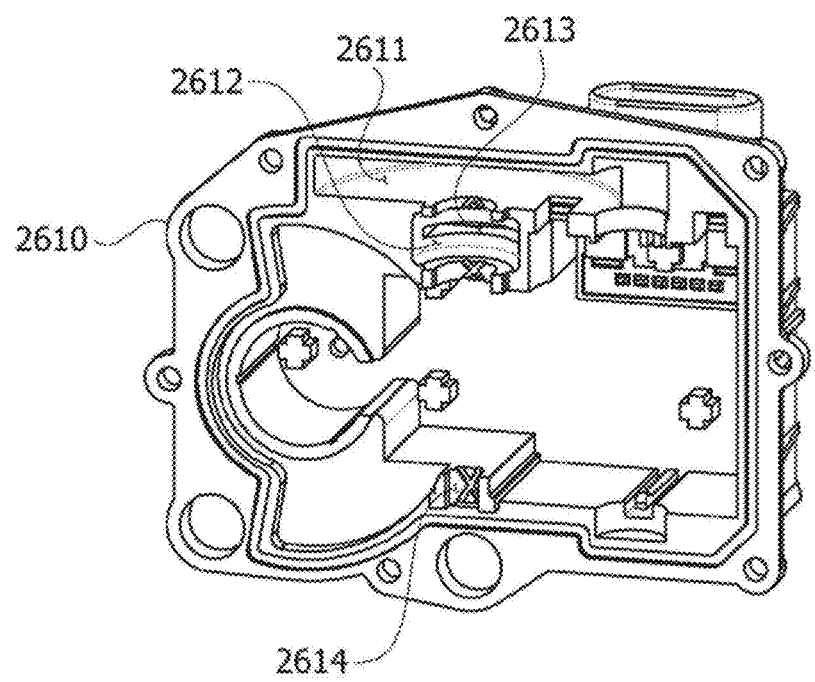
FIG. 11 is a view illustrating an inner structure of a first housing which is a component of the second embodiment of the present invention.
Figure 12:
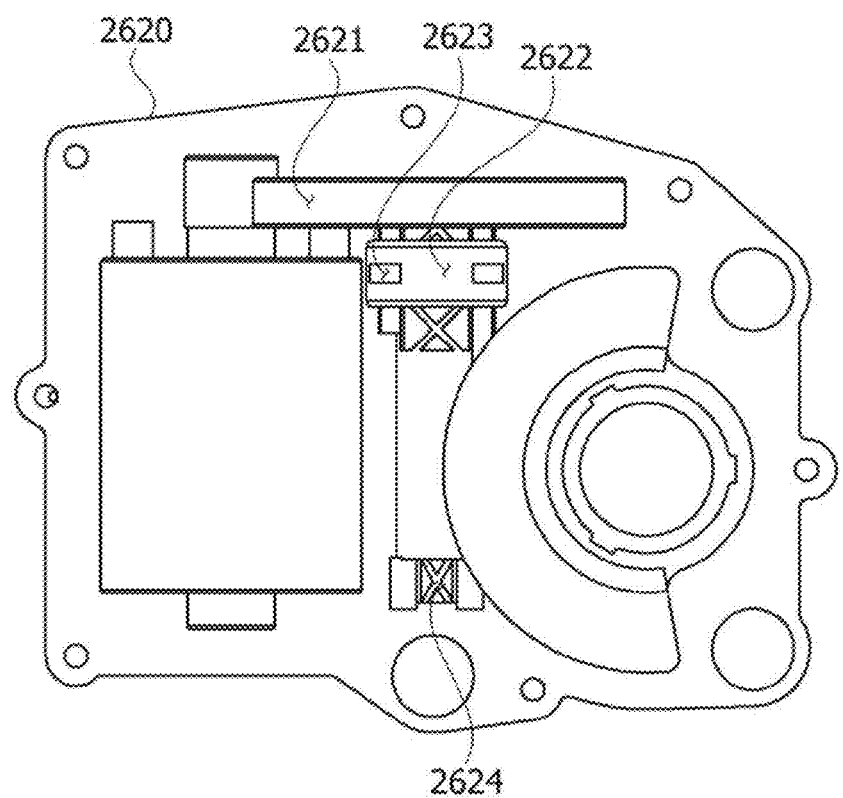
FIG. 12 is a view illustrating an inner structure of a second housing which is a component of the second embodiment of the present invention.
Figure 13:
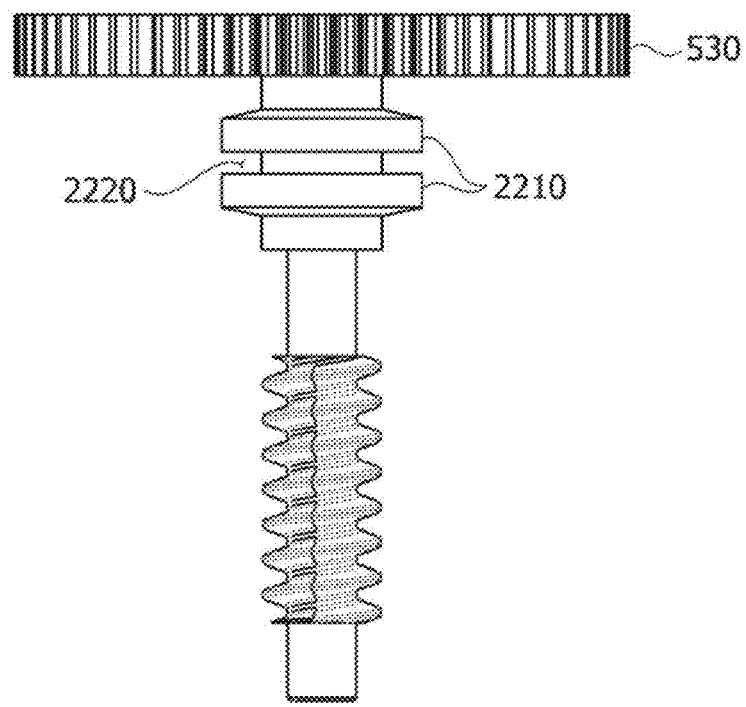
FIG. 13 is a view illustrating a coupling structure between a spur gear and a worm gear, which are components of the second embodiment of the present invention.

FIG. 10 is a view illustrating a coupling structure of a parking brake actuator according to a second embodiment of the present invention, FIG. 11 is a view illustrating an inner structure of a first housing which is a component of the second embodiment of the present invention, FIG. 12 is a view illustrating an inner structure of a second housing which is a component of the second embodiment of the present invention, and FIG. 13 is a view illustrating a coupling structure between a spur gear and a worm gear, which are components of the second embodiment of the present invention.

Referring to FIGS. 10 to 13, a housing 600 may be formed by connection between a first housing 2610 and a second housing 2620 configured to accommodate a second gear 520 and a worm gear 200.

A spur gear accommodation groove 2611 in which the second gear 520 is accommodated, and a support accommodation groove 2612 formed at one area of the worm gear 200 may be formed in the first housing 2610. The spur gear accommodation groove 2611 forms an inner space in which the second gear 520 connected to a motor 100 to receive a driving force of the motor is rotatable. The support accommodation groove 2612 forms a space, into which a support 2210, configured to support an entire parking brake actuator when the second gear 520 and the worm gear 200 are connected and rotate, is inserted. A first bracket fixing groove 2613 configured to fix a first bracket 2710 may be formed in one area of a center of the support accommodation groove 2612, and the first bracket 2710 may be inserted into the first bracket fixing groove 2613 to be connected to the support 2210. The first housing 2610 and the first bracket 2710 may be connected through bonding, double injection, or the like, and may be modified in various methods.

Further, in order to stably support the worm gear 200, a worm gear fixing groove 2614 in which one side end portion of the worm gear 200 is located may be formed. The worm gear fixing groove 2614 may accommodate the worm gear 200 at the same level as the support accommodation groove 2612 to inhibit separation of the worm gear 200.

The second housing 2620 may be connected to face the first housing 2610 and may form an inner space in which components are located. The second housing 2620 may have a spur gear accommodation groove 2621 and a support accommodation groove 2622 formed therein to face each of the spur gear accommodation groove 2611 and the support accommodation groove 2612 formed in the first housing 2610, and a worm gear fixing groove 2624 configured to inhibit separation of the worm gear 200.

Second bracket fixing grooves 2623 configured to support a second bracket 2720 may be formed in one area of the support accommodation groove 2622. The second bracket fixing grooves 2623 are located to face the first bracket fixing groove 2613, and the second bracket 2720 is inserted into the second bracket fixing grooves 2623. As an embodiment, the second bracket fixing grooves 2623 may be provided to face each other in the support accommodation groove 2622 to accommodate both end portions of the second bracket 2710.

When the first housing 2610 and the second housing 2620 are connected, the first bracket 2710 and the second bracket 2720 may surround an outer circumferential surface of worm gear 200 by being in contact with each other, and may inhibit abrasion of the housing 600 due to rotation of the worm gear 200 by inhibiting contact with the housing.

The second gear 520 has sawteeth 530 formed on an outer circumferential surface thereof, and the sawteeth 530 are connected to the motor 100 to receive power of the motor. A general plate shape gear may be used as the second gear 520.

The worm gear 200 may have one side connected to the second gear 520 to receive a driving force of the motor 100, and the other side of the worm gear 200 may have a fixed position due to the worm gear fixing grooves 2614 and 2624 formed in the housing 600. The support 2210 inserted into the support accommodation grooves 2612 and 2622 formed in housing 600 to support the worm gear 200 may be provided on one area of the worm gear 200. The support 2210 may be formed in a cylindrical shape to stably support the rotation of the worm gear 200.

An insertion groove 2220 into which the first bracket 2710 is inserted may be formed in one area at a center of the support 2210 along an outer circumferential surface of the support 2210. The support 2210 is cut by the insertion groove 2220 and located to face each other. The insertion groove 2220 may form a space in which the first bracket 2710 and the second bracket 2720 are inserted to support the worm gear 200, and may be provided to have a predetermined width so that the bracket is inserted. Connection between the worm gear 200 and the second gear 520 may be formed by molding using a resin material, and may be performed through insertion-injection.

The bracket is located between the worm gear 200 and the housing 600, and may be formed as a pair of brackets configured to surround the outer circumferential surface of the worm gear 200 to support the worm gear 200. The bracket includes the first bracket 2710 and the second bracket 2720, and the support 2210 may be located in an inner space formed by coupling the first bracket 2710 and the second bracket 2720.

The first bracket 2710 may be formed in a U shape to accommodate the support 2210, and have one side fixed to the first bracket fixing groove 2613, and the second bracket 2720 may be inserted into an open portion of the other side of the first bracket 2710.

The second bracket 2720 may be inserted into the open portion of the first bracket 2710 to fix the support 2210, and one side of the second bracket 2720 may be fixed to the second bracket fixing grooves 2623. The second bracket 2720 may include a main body 2722 inserted into the second bracket fixing grooves 2623, and a protrusion 2724 inserted into the open portion of the first bracket 2710. Since the main body 2722 may be provided in a bar shape and have both sides inserted into the second bracket fixing grooves 2623, the main body 2722 may press the support 2210 when the housing 600 is coupled thereto. The protrusion 2724 may be formed in a plate shape having a predetermined thickness, and may have one side connected to the main body 2722, and the other side inserted into the open portion of the first bracket 2710. An insertion area of the protrusion may be formed in a curved shape to press a curved surface of the support 2210.

The first bracket 2710 and the second bracket 2720 may each be formed of a metal material. When the support 2210 molded using a resin material comes into contact with the housing 600, abrasion occurs due to contact between the resin materials. However, the first bracket 2710 and the second bracket 2720 each formed of the metal material may inhibit abrasion of the housing due to contact between the metal material and the resin material even when coming into contact with the housing 600.

Figure 14:
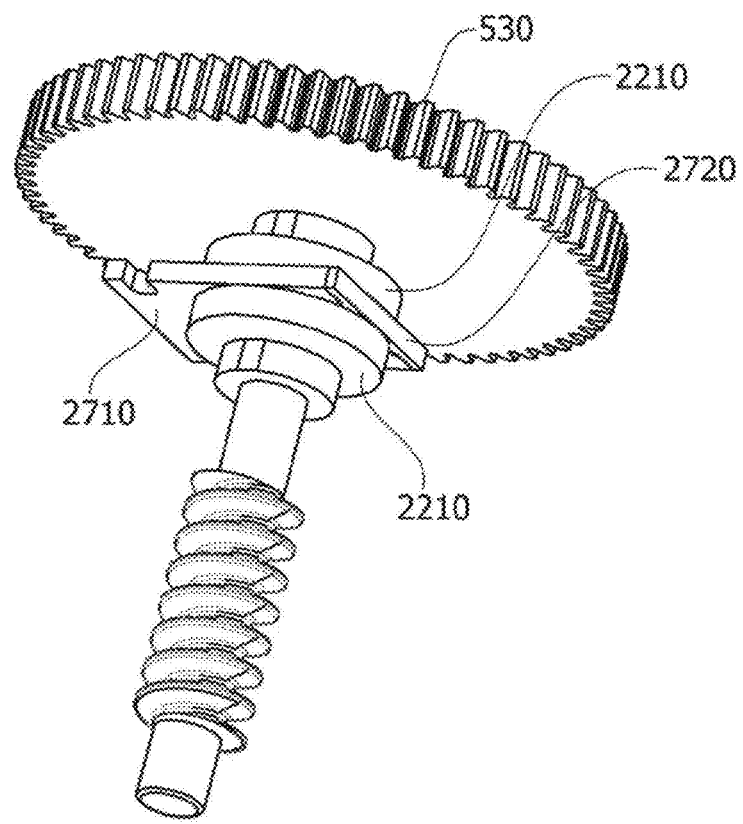
FIG. 14 is a view illustrating a coupling structure between a bracket and a worm gear, which are components of the parking brake actuator.

FIG. 14 is a view illustrating a coupling structure between a bracket and a worm gear, which are components of the parking brake actuator.

Referring to FIG. 14, the first bracket 2710 and the second bracket 2720 are coupled to the insertion groove 2220 formed in the support 2210 to support the worm gear 200, and the outer circumferential surface of the support 2210 may be surrounded by coupling the first bracket 2710 and the second bracket 2720, and thus separation thereof from the housing 600 may be inhibited.

Further, the present invention may be implemented as a vehicle including a parking brake actuator including a motor 100, a second gear 520 connected to the motor 100 so that power may be transmitted, a worm gear 200 connected to the second gear 520, and a first housing 2610 and a second housing 2620 configured to accommodate the second gear 520 and the worm gear 500, wherein a pair of brackets configured to surround an outer circumferential surface of the worm gear 200 are located between the worm gear 200 and the housing.

The vehicle includes the parking brake actuator configured to decelerate and stop a driving vehicle and to maintain a stopped state of the vehicle, and such the parking brake actuator decelerates and stops the driving vehicle, while maintaining the vehicle in the stopped state.

As described above, the embodiments of the present invention has been specifically viewed with reference to the accompanying drawings.

The above descriptions are only exemplary description of the spirit of the present invention, and those skilled in the art may be capable of variously modifying, changing, and substituting the present invention within the fundamental characteristic of the present invention.

Accordingly, the embodiments disclosed in the present invention and the accompanying drawings are not for limiting the technical spirit of the present invention but for describing the technical spirit of the present invention, and thus the scope of the technical spirit of the present invention is not limited by the embodiments and the accompanying drawings. The scope of the present invention has to be understood by the scope of the claims which will be described below, and all technical spirit within the scope the same as the scope of the claims has to be understood to be included in the scope of the present invention.

REFERENCE NUMERALS

100: motor, 200: worm gear, 300: worm wheel, 400: driving shaft, 500: power transmission gear, 510: first gear, 520: second gear, 600: housing

The invention claimed is:

1. A parking brake actuator comprising:
    a motor;
    a worm gear connected to the motor so that power is transmittable therebetween;
    a worm wheel engaged with the worm gear;
    a driving shaft coupled to the worm wheel and to which a parking cable is connected; and
    a power transmission gear including a first gear directly coupled to a rotary shaft of the motor, and a second gear directly coupled to the rotary shaft of the worm gear and directly connected to the first gear so that the power is transmittable therebetween,
    wherein a gear ratio between the first gear and the second gear is 10:66 and a gear ratio between the worm gear and the worm wheel is 1:54.

2. The parking brake actuator of claim 1, wherein:
    the number of teeth of the first gear is ten;
    the number of teeth of the second gear is 66; and
    the number of teeth of the worm wheel is 54.

3. The parking brake actuator of claim 2, wherein the worm gear has the rotary shaft disposed to be spaced apart from a rotary shaft of the motor.

4. The parking brake actuator of claim 3, wherein the rotary shaft of the motor and the rotary shaft of the worm gear are disposed to be parallel to each other.

5. The parking brake actuator of claim 4, wherein the first gear and the second gear are engaged with each other.

6. The parking brake actuator of claim 5, wherein, on the basis of a base line that is perpendicular to a rotary shaft direction of the motor and passes through the first gear, the motor is disposed at one side of the base line, and the worm gear is disposed at the other side of the base line.

7. A parking brake actuator comprising:
a motor;
a first gear directly coupled to a rotary shaft of the motor;
a second gear directly connected to the first gear so that power is transmittable therebetween;
a worm gear directly connected to the second gear; and
a housing in which the second gear and the worm gear are disposed,
wherein the second gear is directly coupled to the worm gear in a pressing method.

8. The parking brake actuator of claim 7, wherein:
an insertion hole is formed in the second gear so that an insertion part of the worm gear is pressed; and
the insertion part and the insertion hole have an engaging structure.

9. The parking brake actuator of claim 8, wherein:
the worm gear includes a support inserted into the housing; and
the support is formed of a metal material.

10. The parking brake actuator of claim 9, wherein the support is inserted into the housing in a cylindrical shape to support rotation of a gear.

11. The parking brake actuator of claim 10, wherein a protrusion is formed on one area of a center of the support and inserted into the housing.

12. The parking brake actuator of claim 11, wherein the protrusion protrudes to a predetermined thickness.

13. A parking brake actuator comprising:
a motor;
a first gear directly coupled to a rotary shaft of the motor;
a spur gear directly connected to the meter-first gear so that power is transmittable therebetween;
a worm gear directly connected to the spur gear; and
a first housing and a second housing configured to accommodate the spur gear and the worm gear,
wherein a pair of brackets configured to surround an outer circumferential surface of the worm gear are located between the worm gear and the housings,
wherein the pair of brackets are formed of a metal material and include a first bracket and a second bracket, the first bracket fixed to the first housing and the second bracket pressed by the second housing, and
wherein the first housing has a support accommodation groove configured to accommodate a support provided in the worm gear in a cylindrical shape, and an insertion groove, into which the first bracket is inserted, is formed in one area of a center of the support along an outer circumferential surface of the support.

14. The parking brake actuator of claim 13, wherein a second bracket fixing groove into which the second bracket is inserted is formed in the second housing.

15. The parking brake actuator of claim 13, wherein the first housing has a support accommodation groove configured to accommodate a support provided in the worm gear in a cylindrical shape, and an insertion groove, into which the first bracket is inserted, is formed in one area of a center of the support along an outer circumferential surface of the support.

16. The parking brake actuator of claim 15, wherein the second bracket includes a main body that is in contact with the first bracket, and a protrusion inserted into the first bracket.

17. The parking brake actuator of claim 16, wherein a portion of the protrusion inserted into the first bracket is formed in a curved shape.

* * * * *